United States Patent
Srinivasachar et al.

(10) Patent No.: US 12,296,384 B1
(45) Date of Patent: May 13, 2025

(54) CHEMICAL LOOPING CARRIER COMPOSITIONS, BINDERS, AND RELATED METHODS

(71) Applicant: Enervex, LLC, Sturbridge, MA (US)

(72) Inventors: Srivats Srinivasachar, Sturbridge, MA (US); Aaron Koenig, Grand Forks, ND (US)

( * ) Notice: Subject to any disclaimer, the term of this patent is extended or adjusted under 35 U.S.C. 154(b) by 0 days.

(21) Appl. No.: 18/642,187

(22) Filed: Apr. 22, 2024

Related U.S. Application Data (60) Division of application No. 17/196,105, filed on Mar. 9, 2021, now Pat. No. 11,969,786, which is a continuation-in-part of application No. 17/030,166, filed on Sep. 23, 2020, now abandoned.

(51) Int. Cl.
| | |
|---|---|
| B22F 1/105 | (2022.01) |
| B22F 1/103 | (2022.01) |
| B22F 3/10 | (2006.01) |
| F23C 10/04 | (2006.01) |

(52) U.S. Cl.
CPC ............ B22F 1/105 (2022.01); B22F 3/1003 (2013.01); F23C 10/04 (2013.01); B22F 1/103 (2022.01); B22F 2302/25 (2013.01); F23C 2206/10 (2013.01); F23C 2900/99008 (2013.01)

(58) Field of Classification Search
CPC ........... C22B 1/24; C22B 1/2406; C22B 5/08; C22B 5/10
See application file for complete search history.

(56) References Cited

U.S. PATENT DOCUMENTS 2,844,457 A * 7/1958 Amberg ................ C22B 1/2406
75/313

* cited by examiner

Primary Examiner — Sally A Merkling
Assistant Examiner — Ricardo D Morales
(74) Attorney, Agent, or Firm — Prince Lobel Tye LLP (57) ABSTRACT

A composition for binding metal oxides, a metal oxide pellet produced with the binder and metal oxide, and methods for producing the metal oxide pellets. The binder composition includes a pelletizing agent comprising at least one of a cement, a bitumen, and a polymer and a sinter enhancer comprising at least one of a metal sulfide, a metal chloride, and a metal nitrate.

10 Claims, 2 Drawing Sheets

CHEMICAL LOOPING CARRIER COMPOSITIONS, BINDERS, AND RELATED METHODS

CROSS-REFERENCE TO RELATED APPLICATIONS

This application is a Divisional of application Ser. No. 17/196,105 filed on Mar. 9, 2021, which itself is a Continuation in Part of application Ser. No. 17/030,166, filed on Sep. 23, 2020. Priority is claimed. The entireties of both prior applications are incorporated by reference herein.

FIELD

The present invention relates to a binder for metal oxides. The binder is specifically intended for the manufacture of materials for redox and carbonate-oxide cycling for use in processes such as chemical looping combustion, chemical looping gasification, chemical looping hydrogen production, and calcium looping.

BACKGROUND

Binders for metal oxides are commonly employed in metal ores processing. Beneficiation of such ores includes grinding them to particle sizes as small as 30 microns, followed by fines agglomeration. This generates a coarse product or pellet for subsequent processing. A common binder that is used during the agglomeration step is bentonite, but loadings should be limited to avoid increase in the gangue content of the agglomerated product. Alternatives, such as given in U.S. Pat. No. 5,294,250, utilize two strategies. One strategy is to use a binder having a high surface area of 15 to 20 m$^2$/g, such as finely ground material (e.g. forsterite). Another is to use a binder composition that is supplemented by a small amount of an enhancer of the polysaccharide type. However, in order to achieve desirable mechanical strength of the pellet, the combination has to be fired at very high temperatures of 1250-1320° C.

A binder for metal oxides may also be used in the manufacture of materials for chemical looping process applications, including chemical looping combustion. Objectives similar to those described for metal ore processing are desirable for the formulation of oxygen carriers for chemical looping application with binders. These include high product strength and increased product lifetime within the process. In such instances, a non-diluting characteristic of the binder is beneficial; to increase the quantity of active components, and allow recycling of attrited fines generated from the process via re-agglomeration.

Several metal oxide materials have applications for the exchange of oxygen via operation under redox conditions. In particular, chemical looping combustion has garnered significant interest. Chemical looping combustion is the cycling of a metal oxide-based oxygen carrier looping material through reductive and oxidative conditions by means of a hydrocarbon-based fuel and air. Chemical looping combustion advantageously generates a nitrogen-free $CO_2$ stream that can be sequestered or beneficially used. Generated heat may be used for power generation and the segregation of the fuel and air allows for inherent and lower cost carbon dioxide separation and capture.

The utilization of a hydrocarbon fuel for energy production requires its reaction with an oxidant. This is commonly supplied by oxygen in air. In direct reaction between fuel and air, the resulting product is diluted by the inert nitrogen in the air that is carried through the process. In such combustion systems, the primary products of $CO_2$ and $H_2O$ are vented to the atmosphere as further processing of the dilute stream (nitrogen-containing) is economically prohibitive. In gasification systems, the primary syngas product (carbon monoxide/hydrogen) is of lower quality (diluted with nitrogen) and not suitable for chemical synthesis applications. One solution to eliminate nitrogen from the product streams is the use of an intermediary, between the fuel and the air. This intermediary, commonly referred to as oxygen carriers (metal oxide-based looping material), cycles the process between two reactor sections; in the "reducer" section the oxygen carrier gives up its oxygen to the hydrocarbon fuel and oxidizes the fuel partially (to make high quality syngas) or fully (to make pure $CO_2$ and $H_2O$), while the oxygen carrier is reduced; in the oxidizer section the reduced oxygen carrier is contacted with air to re-oxidize the oxygen carrier material. As a result, the oxygen carrier switches between oxidized and reduced forms. The above approach allows for segregation of fuel and air, and thus elimination of nitrogen in the product gases.

Oxygen carriers have been extensively studied. Oxygen carriers, similar to those described by U.S. Pat. No. 9,777,920, are typically particles with sizes ranging from 100 microns to a few millimeters that are comprised of active and inert materials. The active materials commonly contain the elements of Fe, Mn, Cu, Ni, or Co either as blends or single metal oxides. It is this constituent that undergoes redox reactions with the fuel and air. The inert portion of the oxygen carrier acts as a support providing mechanical strength and a structure to limit attrition losses. Common support materials include oxides of calcium, aluminum, zirconium or titanium, or ceramics such as calcium aluminates and clays.

Chemical looping combustion (CLC) is the application of oxygen carriers in combustion processes. This technology has been extensively studied with both solid and gaseous fuels, and with various reactor designs, such as fixed beds and circulating fluidized beds. CLC provides a means of converting a carbonaceous fuel into energy for power generation while also producing a carbon dioxide capture-ready stream. A major drawback with CLC is the large ratio of oxygen carrier to fuel required to ensure complete fuel conversion. In circulating systems, moving large quantities of solids, in addition to those solids being stressed with continual redox or cyclic reactions, makes attrition resistance a vital characteristic of oxygen and other looping carriers.

Modification of the oxidation step in CLC process results in another application of oxygen carriers. Steam may be used instead of air to oxidize the oxygen carrier. Condensation of the product gas yields a highly pure hydrogen stream. This is in contrast to the commonly used steam reforming process in which a mixed hydrogen and carbon dioxide is produced. Additionally, it is feasible to operate at pressure in some manner akin to that given by U.S. Pat. No. 10,280,079 thus reducing hydrogen product compression costs.

Oxygen carriers can also be applied to gasification systems in a process that is termed chemical looping gasification (CLG). Gasification of solid fuels, such as coal and biomass, yield a mixture of CO, $H_2$, and $CO_2$ commonly referred to as syngas. The syngas can used as a precursor for Fischer-Tropsch and methanol production or it can be used as a fuel for power generation. To produce a syngas of high quality the use of an air separation unit is required to provide a nitrogen-free oxidant to the gasifier. In CLG, the oxygen carriers provide the nitrogen-free oxidant thus replacing the costly air separation unit. A major challenge is the selection of an oxygen carrier and reactor design which results in higher rates of oxygen transfer to the solid fuel than the rates of oxygen transfer to the syngas product. Oxygen carriers with ferrite phases given by U.S. Pat. No. 10,030,204 have been shown to possess this selectivity. As it is for CLC oxygen carriers, attrition resistance is an important requirement for CLG oxygen carriers as well.

Chemical looping can be extended beyond oxygen transfer methods. For instance, materials capable of $CO_2$ transfer are desired for applications of $CO_2$ capture. To maintain generality, materials used in chemical looping processes (metal oxide-based looping materials) will also sometimes be referred to as looping carriers. In calcium looping (CaL), the looping carrier cycles between CaO and $CaCO_3$, allowing for selective $CO_2$ removal from flue gases for post combustion capture. Also, as a post combustion technique, it has the advantage of easier integration with existing processes. Also, CaL may be used to enhance water gas shift processes by removing $CO_2$ thus driving the reaction forward to produce more $H_2$ and fully convert the carbon monoxide.

Cycling in a CaL process involves a heat generating-carbonation step (sorbent uptake) and an endothermic calcination (sorbent regeneration) step. Temperature swing, pressure swing, steam sweep gas, or a combination may be used to provide the cycling driving force. Temperatures of the carbonator and calciner range from 600-800° C. and 800-1000° C., respectively. Heat required may be provided directly with an oxy-fired flame or indirectly from some suitable source. As a benefit of operating at these high temperatures, the heat required for looping carrier regeneration can be mostly recovered (for example, into a power cycle) during the carbonation step. This is contrary to amine scrubbing which operates at low temperatures leaving unusable heat.

Looping carriers used for calcium looping systems have primarily been natural materials including limestone, egg shells, and sea shells. These are inexpensive materials. However, they suffer from large losses in carbon dioxide capacity after only a few cycles leading to high replenishment rates. Hydration of the looping carriers has been shown to restore capacity by opening up the pores of the looping carriers. However, this regeneration reduces the mechanical strength and leads to increased attrition losses.

The reactivity and cost are critical characteristics of looping carriers. Reactivity is governed by the overall composition and structure. Iron is typically selected as the primary active component given its low cost, strength, and reasonable reactivity for oxygen looping. Attrition resistance and manufacturing methods are significant factors governing the operating costs attributed to the looping carriers. Common methods of manufacture utilize the sol-gel method or mechanical mixing followed by high temperature calcination, both of which are expensive and unable to reprocess attrited looping carrier on site without significant additional equipment. Given the large quantities of looping carrier material required for chemical looping processes, small improvements in attrition resistance are significant, and a simple means of regenerating or repurposing is desired.

Methods to manufacture looping carriers by mechanical mixing and curing at temperatures less than 1000° C. have been studied. Many such efforts take from cold bonding techniques used to pelletize iron ore in the steel industry. For example, U.S. Pat. Nos. 4,846,884 and 7,896,963 use Portland cement and U.S. Pat. No. 6,676,725 uses calcium aluminate cement to bind iron ore fines. However, the strength of Portland cement decreases substantially with increasing temperature and at temperatures above 700° C. severe degradation occurs.

Calcium aluminate cements are used in refractory concretes for temperatures well beyond 1000° C. Like Portland cement, but to a lesser degree, calcium aluminate cements lose strength with increasing temperature with minimum strength occurring at about 800° C. Increasing the curing temperature beyond this minimum, strength is regained. Green calcium aluminate concretes are typically fired around 1200° C. to allow for high strength ceramic bonds to be formed. This high temperature is beyond what is normally present in chemical looping processes.

These losses in strength may be acceptable for applications in the steel industry as the objective is to provide enough strength to the agglomerate to survive handling and delivery to the blast furnace. This is not the case for looping carrier materials as they are expected to be continually cycled under process conditions. Therefore, there is a need to develop binders and binder production and use methods that are able to yield pellets or agglomerates with enough strength to survive the operating conditions of a chemical looping process for a reasonable lifespan.

SUMMARY

An objective of this disclosure is to provide a binder composition for metal oxide-based looping carriers. The cured binder should provide sufficient strength to limit attrition of the bound metal oxide while being subjected to stresses from reduction and oxidation cycling of the metal oxide, and physical impacts, all of which occur at temperatures from about 700 to 1000° C. The binder should not require curing conditions beyond which can be provided within the process it is to be applied. The binder loading should be limited and not exceed 30-35% by weight in the cured material.

Another objective of this disclosure is to provide a method to produce a looping carrier material for use in chemical looping related processes. A means to manufacture looping carrier materials from inexpensive starting materials such as raw ores, steel making wastes and attrited looping carriers as the source of metal oxides is advantageous to the success of chemical looping processes. The method can allow for customization of the looping carrier composition to meet the specific needs of the desired chemical looping process. In addition, the method should be capable of integration within the chemical looping process, allowing for on-site recycle and regeneration of attrited looping carrier without significant additional equipment.

This disclosure provides a binder composition to bind metal oxides fines into a metal oxide-based looping material precursor pellet. Metal oxide fines are preferably sized below 325 mesh (44 microns), more preferably sized below 20 microns, most preferably sized below 10 microns. The binder is specifically tailored for use in the manufacture of looping carriers of chemical looping processes. It is in essence a two-part binder. In some examples one part of the binder is a pelletizing agent. In some examples the pelletizing agent comprises a cement, bitumen, or polymer binder and is designed for cold bonding and pelletization. Asphalt or oil can be considered as a substitute for bitumen. As is practiced in the art, water may be added to activate cements and polymer binders. Pelletization may also be performed by applying pressure alone (dry pelletization). This allows for formation of the desired shape of the metal oxide-based looping material precursor pellet and to achieve enough strength for handling. The pellet is preferably sized below 10 mm, more preferably sized below 5 mm, most preferably sized below 2 mm. In some embodiments, precursor pellets may be sized preferably between 50 microns and 500 microns to be advantageously used in fluidized bed reactors. The other part of the binder comprises a sinter enhancer such as a metal sulfide, metal chloride, or metal nitrate. Additionally, a carbonaceous material may optionally be added as an exotherm generator to improve sintering of the metal oxides. The binder constituents, including the sinter enhancer, exotherm generator, and pelletization agents, are preferably sized below 325 mesh (44 microns), more preferably sized below 20 microns, most preferably sized below 10 microns. In some embodiments, the binder constituents, including the sinter enhancer, exotherm generator, and pelletization agents, are preferably sized below about 5 microns.

This disclosure also provides compositions and methods to make and use a metal oxide-based looping material precursor pellet. Upon exposure of the metal oxide-based looping material precursor pellet to oxidative conditions at sufficient temperature, a well bonded material (metal oxide-based looping material pellet) suitable for use in the high stress conditions of chemical looping processes is obtained.

This disclosure also provides methods for the manufacture of a looping carrier material specifically from low cost starting materials such as steel mill wastes. This disclosure also provides methods for the manufacture of a looping carrier material from attrited looping carrier fines also sometimes referred to as reclaimed metal oxide-based looping material. One method follows two stages: in the first stage the desired constituents of the looping carrier are mixed with a metal sulfide binder and a pelletizing additive and pelletized. The pelletized looping carrier precursor pellet is then fed into an oxidation section of the chemical looping system.

Another aspect of this disclosure, is that it provides a means to reconstitute attrited fine material into a usable oxygen carrier. Reforming of the oxygen carrier can comprise two stages. First, attrited fine material and sintering enhancer additives are cold bonded together by means of a pelletizing additive to form pellets of a size suitable for process conditions. Second, the material undergoes a sintering procedure at process temperatures including oxidation. The resulting oxygen carrier has superior attrition resistance compared to a reformed oxygen carrier without the sintering additives. Additionally, it has lost its propensity to sinter any further at process temperatures due to chemical transformation of the sintering enhancer additive, thus avoiding subsequent agglomeration issues.

The use of a pelletizing additive that is able to be regenerated after exposure to looping conditions may eliminate or reduce the requirement of fresh pelletizing agent needed for reconstitution of attrited fine material. For example, the pelletizing agent calcium aluminate cement becomes anhydrous at about 700° C. The reclaimed metal oxide-based looping material that originated from a looping material that used calcium aluminate cement as a pelletizing agent could therefore contain a hydratable cement and may only require addition of water and sinter enhancers to reform the metal-oxide based looping material pellet.

The use of magnetic species as a major component of the oxygen carrier can provide a means to recover elutriated fines by processing dust collector fines via magnetic separation to recover the magnetic oxygen carrier components. Recovered material can include iron oxides and ferrites of calcium and manganese. The addition of fresh binder material allows for achieving the final desired composition of the reformulated material that can be recycled to the chemical looping combustion process. Alternatively, recovered fines could be sent for reprocessing within the iron/steel manufacturing industry.

All examples and features mentioned below can be combined in any technically possible way.

In one aspect a binder composition for binding metal oxides includes a pelletizing agent comprising at least one of a cement, calcium aluminate cement, Portland cement, lime, hydrated lime, dolomitic lime, calcium oxide, magnesium oxide, a bitumen, polysaccharides, polyvinylpyrrolidone, polyvinyl alcohol, polyurethane, bentonite, and a clay, and a sinter enhancer comprising at least one of a metal sulfide, a metal chloride, and a metal nitrate.

Some examples include one of the above and/or below features, or any combination thereof. In an example the binder composition comprises a sinter enhancer and up to about 95% by weight of a pelletizing agent. In an example the sinter enhancer comprises at least one of a metal sulfide, a metal chloride, and a metal nitrate. In an example, the sinter enhancer constitutes at least 5% by weight of the binder. In an example the pelletizing agent comprises at least one of cement, calcium aluminate cement, Portland cement, lime, hydrated lime, dolomitic lime, calcium oxide, magnesium oxide, a bitumen, polysaccharides, polyvinylpyrrolidone, polyvinyl alcohol, polyurethane, bentonite, and a clay. In an example the sinter enhancer comprises at least one of sulfides, chlorides, or nitrates of the metals: Fe, Mn, Cu, Ni, Co, Mg, Ca, Sr, Ba, and combinations of these. In an example the binder composition further comprises an exotherm generator material. In an example the exotherm generator material comprises at least one of a carbonaceous material, a metal, a reduced metal oxide, and an organometallic compound. In an example the exotherm generator material constitutes at least about 5% by weight of the binder. In an example lime, hydrated lime, calcium oxide, magnesium oxide, dolomitic lime and combinations thereof are present in at least about 15% by weight of the binder composition.

In another aspect, a binder composition for binding metal oxides includes about 5-30% by weight of a sulfide of at least one of the metals Fe, Mn, Cu, Ni, Co, Mg, Ca, Sr, and Ba, about 5-30% by weight finely ground carbonaceous material, and about 40-90% by weight pelletizing agent. In another example, the pelletizing agent in the above binder composition is calcium aluminate cement.

In another aspect, a binder composition for binding metal oxides includes about 5-30% by weight of a sulfide of at least one of the metals Fe, Mn, Cu, Ni, Co, Mg, Ca, Sr, and Ba, about 5-30% by weight finely ground carbonaceous material, and about 20-70% by weight calcium aluminate cement and about 20-70% by weight calcium oxide.

In another aspect a binder composition for binding metal oxides includes about 5-30% by weight of a sulfide of the metals Fe, Mn, Cu, Ni, Co, Mg, Ca, Sr, Ba or combinations of these, about 20-50% by weight bitumen, and about 30-70% by weight calcium oxide.

In another aspect a metal oxide-based looping material precursor pellet is produced by pelletizing a mixture including metal oxides of at least one of the metals Fe, Mn, Cu, Ni, Co, Mg, Ca, Sr, and Ba, and a sinter enhancer comprising at least one of a metal sulfide, a metal chloride, and a metal nitrate. In an example the metal oxide-based looping material precursor further comprises a pelletizing agent that comprises at least one of a cement, calcium aluminate cement, Portland cement, lime, hydrated lime, dolomitic lime, calcium oxide, magnesium oxide, a bitumen, a polysaccharide, polyvinylpyrrolidone, polyvinyl alcohol, polyurethane, bentonite, and a clay. In an example the metal oxide-based looping material precursor pellet further comprises an exotherm generator material that comprises at least one of a carbonaceous material, a metal, a reduced metal oxide, and an organometallic compound.

In another aspect a metal oxide-based looping material precursor pellet comprises reclaimed metal oxide-based looping material and a sinter enhancer comprising at least one of a metal sulfide, a metal chloride, and a metal nitrate.

Some examples include one of the above and/or below features, or any combination thereof. In some examples the metal oxides are in either pure, ore, or industrial waste form and are comprised of at least one of the elements Fe, Mn, Cu, Ni, Co, Mg, Ca, Sr, and Ba. In some examples at least some of the metal oxides are in an oxidation state capable of being further oxidized under temperatures less than 1000° C. and a partial pressure of oxygen less than 0.2 atm. In some examples at least some of the metal oxides comprises at least one of FeO and MnO. Examples of such include steel wastes. In some examples the sinter enhancer comprises at least one of sulfides, chlorides, and nitrates of at least one of the metals: Fe, Mn, Cu, Ni, Co, Mg, Ca, Sr, and Ba. In some examples pelletizing is performed with the addition of a binding quantity of hydraulic cement. In some examples pelletizing is performed with the addition of a binding quantity of bitumen. In some examples the ratio of metal oxides to sinter enhancer is between 80 to 1 and 10 to 1 by weight. In some examples a metal oxide-based looping material results from treating the metal oxide-based looping material precursor by exposing the precursor pellet to oxidative conditions of no more than 1000° C. and for a time period such that it is at least 80 percent oxidized, where 80 percent oxidized corresponds to the state at which 80 percent of the total oxygen required to transition the precursor pellet from the initial state to the equilibrium state has reacted with the metal oxide-based looping material precursor. The resulting physical structure of the metal oxide-based looping material provides resistance to attrition with jet attrition index as defined in the Examples Section of less than 1.

DETAILED DESCRIPTION

In a typical design of a chemical looping system, the oxygen carrier is transported between an air and fuel fluidized bed reactors. This high rate of solids motion coupled with redox cycling makes attrition losses significant. Incorporating an inert support material into the oxygen carrier seeks to improve attrition resistance. Also, the use of inexpensive iron ores as the major component of the oxygen carrier helps to mitigate the costs of attrition. Further cost reduction would be realized if the elutriated fines were able to be recycled.

Figure 1:
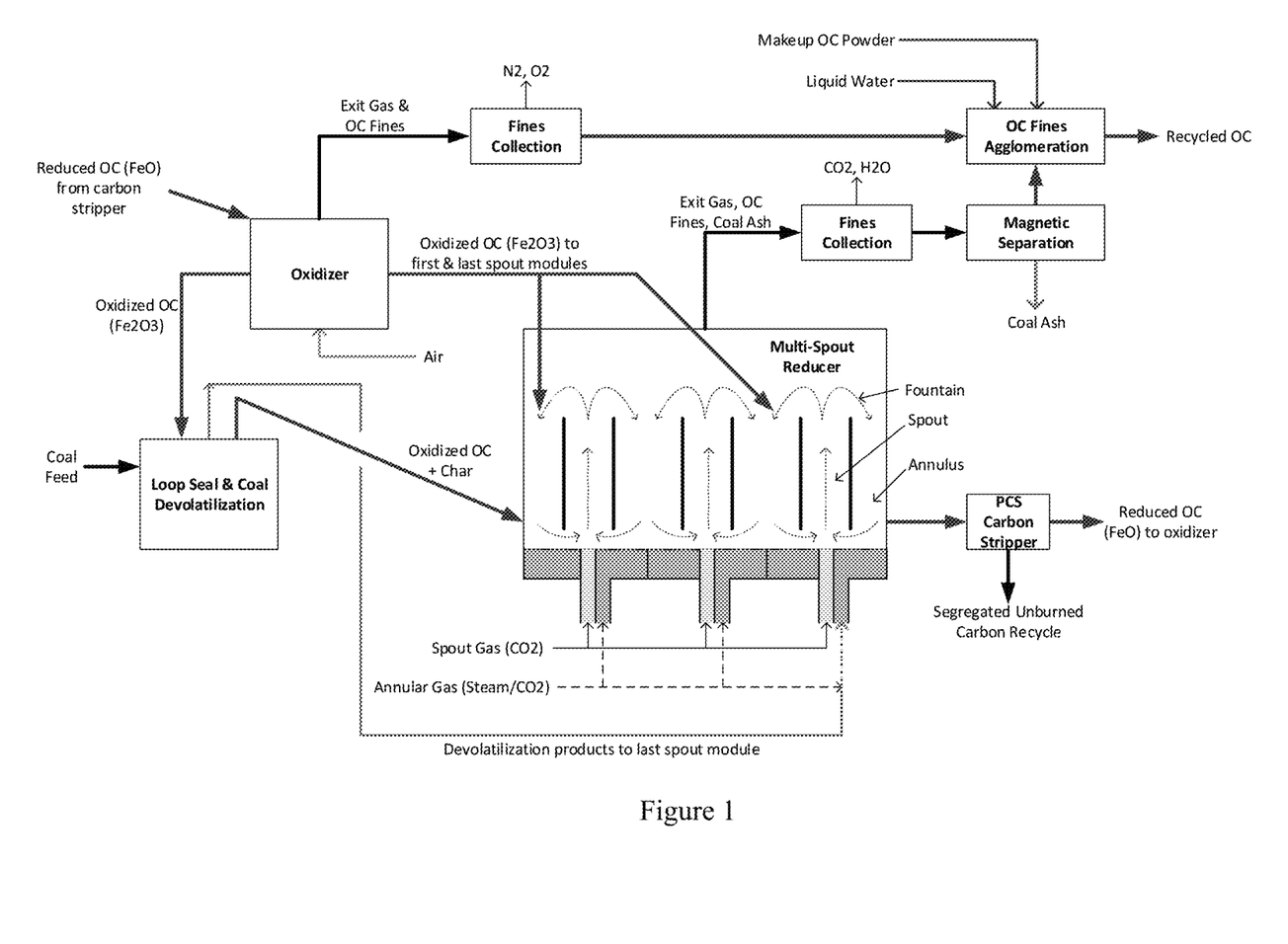
FIG. 1 is a schematic diagram of a chemical looping process.

FIG. 1 shows a preferred embodiment of a chemical looping coal combustion process with oxygen carrier material fines recycle. In the process, coal is introduced into a pre-reducer (loop seal region), where it is contacted with a portion of hot oxidized oxygen carrier (OC) from the oxidizer. As a result, the coal undergoes pyrolysis to form volatiles and char. The char along with the oxidized OC are then introduced to the first stage of a multi-stage reducer. The reducer may be of a fluid bed design, and preferably a spouted fluid design. The multi-stage reducer comprises multiple modules, which allows independent control of process gases for purposes of fluidization and material movement as well as material conversion in each zone. Steam or $CO_2$ or a combination can be used as the fluidizing/reacting and spout gas. As the char and the oxidized OC interact in the reducer, char is oxidized and mostly converted to $CO_2$ and $H_2O$, while the OC is reduced. Some carbon monoxide may also be formed and not fully oxidized to $CO_2$. With respect to the solid material, for example, $Fe_2O_3$ in an iron-based oxygen carrier is reduced to $Fe_3O_4$ and perhaps further reduced to FeO. The volatiles from the coal pyrolysis step are preferentially introduced into last module or zone of the multi-zone reducer to increase the degree of reduction of the oxygen carrier material leaving the reducer and increasing its oxygen carrying capacity. Freshly oxidized OC may be introduced, in part, to this zone to fully oxidize the volatiles. The solids leaving the reducer may have a small portion of the char unconverted, and, it may be preferred to have a particulate char separator (PCS) or carbon stripper placed downstream of the reducer. The segregated char from the stripper may be recycled to the front of the reducer section to improve char conversion to oxidized products (e.g. $CO_2$ to $H_2O$). The reduced oxygen carrier ($FeO/Fe_3O_4$) is returned to the oxidizer to complete the loop. Air is used in the oxidizer to oxidize the material back to mostly $Fe_2O_3$.

At the exit of the oxidizer and the reducer, the process gases are separated from the particulate using a device such as a cyclone and subsequently with a baghouse/fabric filter. Solids removed using a cyclone will typically be large enough in size to not cause any process difficulties related to material flowability and also will effectively participate in the oxidation/reduction steps. But fines that are not captured with a cyclone, typically below about 20-30 microns, are removed with a bag filter and cannot be recycled indefinitely; they will be elutriated in the fluid bed and will not spend enough residence time to effectively engage in the reduction reactions. So they have to be processed to recover active components and then incorporated as part of larger pellets (re-agglomeration). The oxygen carrier (OC) fines collected in the baghouse (fines collection step) are segregated, for example using magnetic means or by other means (e.g. size and density separation), between desirable (iron-containing components, active oxygen carrier compositions) and disposable fractions (coal ash). The oxygen carrier fines collected from the oxidizer section of the chemical looping process may also preferably be transferred to the reducer section for reduction (lower oxidation state), and then recovered in the particulate removal device in the reducer section portion of the process. In this manner, the reduced attrited particles may be more amenable to magnetic separation. The attrited particles collected in the baghouse may be re-dispersed to physically distance the desirable and disposable particle fractions such as by using a jet mill prior to magnetic separation or separation by other means. In another embodiment, the OC fines may be segregated prior to collection in the baghouse, for example using magnetic means or by other means (e.g. size and density separation), while the fines are still dispersed in entraining gas. This separation may be effected by magnetic, size or density segregation devices place prior to the baghouse. The recovered fines are then agglomerated using water and binders to form a larger pellet/agglomerate and recycled to the process. Pellet/agglomerate sizes range from about 100 microns to a few millimeters, a size that is similar to fresh material, and can be tuned to the requirements of the process. Make-up OC material may be added to the agglomeration step to achieve a desired chemical looping carrier composition. The aforementioned description is not limited to iron oxides as the oxygen carrier, but equally applicable to other materials such as oxides of manganese, nickel, copper, cobalt, as well as other looping carriers.

High strength agglomeration of metal oxide fines is a necessity to an economical implementation of a chemical looping process. A sinter enhancer binding agent for this application leads to improved strength of the looping carrier material at operating temperatures, without the need for a higher temperature treatment. The sinter enhancer binding agent acts as a thermosetting binder with a cure temperature in the range of approximately 700-1000° C.

The binder can have two sets of components. One set provides the cold bonding strength required for material handling. The second set provides the operational strength, following curing at operating temperatures. Components of the first set are selected to provide adequate handling for the desired end use. They may also serve as a useful portion of the cured agglomerate. For example, they can provide the necessary inert components of the looping carrier in chemical looping processes. The components of the second set seek to improve the sintering of the agglomerate by acting as a flux, creating hot spots with combustible or oxidizable material, or both. In addition, these components desirably should either become useful components of the cured material or be removed during the curing. Meeting this condition allows for easier reformulation of looping carrier from attrited material.

An embodiment of this disclosure provides a binder composition for metal oxides. In an example the binder comprises at least about 5% by weight of a sinter enhancer and at most about 95% by weight of a pelletizing agent. The binder is to be mixed with the metal oxides to be bound to form a mixture of about 5% to 30% by weight binder on a dry basis (metal oxide-based looping material precursor). The pelletizing agent may include cements, lime, dolomitic lime, calcium oxide, magnesium oxide, bitumen, polymer binders, bentonite or combinations of these. Polymer binders used include but are not limited to: polyvinylpyrrolidone, polyvinyl alcohol, polyurethane, starches, cellulose, or gums. In another embodiment, calcium oxide, magnesium oxide, hydrated lime, dolomitic lime or combinations thereof is added to make up at least 15% by weight of the combined binder composition.

In one embodiment at least 60% by weight of the metal oxides to be bound are in an oxidation state such that upon exposure to oxidative conditions of no more than 1000° C. and 0.2 atm oxygen partial pressure they enter a higher oxidized state. An example of this is $Fe_3O_4$.

In another embodiment at least 25% by weight of the metal oxides to be bound are in a highly reduced state. This may be the metal oxides FeO or MnO.

In another embodiment the sinter enhancer is a metal sulfide. This may be the sulfides of transition metals such as, Fe, Mn, Cu, Ni, or Co. It may also be the sulfides of alkaline earth metals such as, Mg, Ca, Sr, or Ba.

In another embodiment the sinter enhancer is supplemented with an exotherm generator material. The exotherm generator material comprises at least one of a carbonaceous material, a metal, a reduced metal oxide, and an organometallic compound. The exotherm generator material when subjected to oxidation conditions and elevated temperature undergoes exothermic reaction and creates localized high temperatures that promotes sintering of the reformulated agglomerate and strength development.

In another embodiment the exotherm generator is a finely ground carbonaceous material which is added to make up at least 5% by weight of the combined binder composition.

In one embodiment the exotherm generator is a metal, or an organometallic compound. This may be of transition metals such as, Fe, Mn, Cu, Ni, or Co. Organometallic compounds may include nickel and iron carbonyl.

In another embodiment the sinter enhancer is a salt such as a metal chloride. This may be the chlorides of transition metals such as, Fe, Mn, Cu, Ni, or Co. It may also be the chlorides of alkaline earth metals such as, Mg, Ca, Sr, or Ba.

In another embodiment the sinter enhancer is a salt such as a metal nitrate. This may be the nitrates of transition metals such as, Fe, Mn, Cu, Ni, or Co. It may also be the nitrates of alkaline earth metals such as, Mg, Ca, Sr, or Ba.

In an example the binder comprises 5-30% by weight metal sulfide, 5-30% by weight carbonaceous material, 20-70% by weight calcium aluminate cement, and 20-70% by weight calcium oxide. The binder is mixed with the metal oxides to be bound to form a mixture of metal oxide-based looping material precursor pellet of about 5-30% by weight binder on a dry basis.

In an example the binder comprises 5-30% by weight metal sulfide, 20-50% by weight bitumen, and 30-70% by weight calcium oxide. The binder is mixed with the metal oxides to be bound to form a mixture (metal oxide-based looping material precursor) of about 5-30% by weight binder on a dry basis.

In an example the binder comprises a quantity of pelletizing agent to form an agglomerate of metal oxides and sinter enhancer with sufficient strength, where the ratio of metal oxides to sinter enhancer ranges between about 80 to 1 and 10 to 1 by weight. Sufficient pelletizing agent is added to provide the green agglomerate with enough strength for handling and transport to final binder curing conditions. The quantity of pelletizing agent is dependent on the pelletizing agent, the material to be bound and the process equipment.

The inadequacy of the pelletizing agent alone can be seen in Wu et al. and will be further demonstrated in the examples provided in this document. The authors sought a means to regenerate a looping carrier for carbon dioxide capture by rebinding calcium oxide fines with calcium aluminate cement. The cement was effective in agglomerating the fines and it also may maintain capacity over cycles by providing resistance to pore closures. On the other hand, it provided little to no increase in attrition resistance. Calcination of the rebound particle was performed at 850° C. which is not high enough for calcium aluminate cement strength development. This issue is not limited to calcium looping and shows the need of a sinter enhancer.

Without being bound by theory, to promote sintering, the sinter enhancer can form a eutectic mixture, or can undergo a reaction leading to new chemical bond formations. This mechanism is advantageous as there are many options of agents which will react under oxidizing conditions at 700-1000° C. Examples of such agents with particular costs advantages are metal sulfide ores such as pyrite, chalcopyrite, or pentlandite. Metal chloride wastes from pickling processes are also a low-cost source. Also, heat is provided during the oxidation of these agents, and more significantly, if the metal oxides are in a reduced form, more heat is provided. This heat creates localized hot spots on which sintering is promoted. Additional heat can be provided with the addition of an exotherm generator such as a carbonaceous material.

The binder composition of the previously described embodiments may be used as follows. If cement is selected as the pelletizing agent, the binder and metal oxides to be bound are intimately mixed. The material and sufficient water to hydrate the cement is fed into a suitable pelletizing device, such as a disc, drum, or pin pelletizer. The cement in the produced agglomerates is allowed to cure. The agglomeration step may be modified to allow for the use of other pelletizing agents. Methods and materials known in the art may be used for the agglomeration/pelletization step.

A heat treatment is required for the agglomerated metal oxides (metal oxide-based looping carrier precursor pellet) to gain full strength. The agglomerates may be dried at 100-150° C. to increase handling strength. Additional agglomerate shaping may be performed after drying if required. The agglomerates are subjected to oxidizing conditions at temperatures ranging from 700-1000° C. for a time period to achieve at least 80 percent oxidized. Oxidizing conditions are met with a continuous flow of gas of at least 5% by volume oxygen at the inlet of the reactor. Steam may also be added to the oxidizing gas. If chlorides are used as a sinter enhancer, addition of at least 5% steam can be used to drive off chlorine, which can be captured as HCl. For chemical looping applications this oxidation step is preferably performed within the oxidation reactor of the process.

Avoidance of prolonged inter-particle contact of the metal oxide-based looping carrier precursor pellets is required to limit inter-particle agglomeration during the heat treatment process. One method to prevent inter-particle agglomeration is to mix the metal oxide-based looping carrier precursor pellets with the metal oxide-based looping carrier pellets in a proportion of about at most 25% precursor material. Heat treatment of the precursor material with the previously described conditions while mixed with previously heat treated material (metal oxide-based looping carrier pellet) reduces inter-particle agglomeration as the metal oxide-based looping carrier precursor pellet loses its agglomeration tendency after heat treatment. This method is suitable for use in the CLC oxidizing section where the metal oxide-based looping carrier precursor is added as a looping carrier make-up stream.

Another method to limit inter-particle agglomeration is to perform the heat treatment in a spouted fluid bed reactor system. A spouted fluid bed reactor may consist of a conventional fluidized bed reactor with the addition of open-ended tubes (draft tubes) within the bed material centered over spout-gas inlets in the floor of the fluid bed. The spout-gas creates an isolated environment from the rest of the fluid bed (annular region) and transports bed material from the bottom to the top of the bed. It is within this isolated spouted region where heat treatment of the metal oxide-based looping carrier precursor pellets is carried out. An oxygen-rich gas is used as the spout-gas and a mostly oxygen-free gas is used to fluidize the annular region. The gas to solid ratio in the spouted region is substantially greater compared to the annular region resulting in two benefits: intensified oxidation, and limited inter-particle contact.

During the oxidation treatment the sinter enhancer in the binder decomposes, releasing the anion and leaving the cation to form oxides binding the base materials. Following the decomposition, the sinter enhancing characteristic is lost therefore avoiding further agglomeration during use of the bound oxides. An added benefit is that the metal of the sinter enhancer can be selected to match the primary metal oxide to be bound and therefore not dilute the active phase in the cured agglomerate. Or a different metal can be selected to increase reactivity or selectivity.

In binders containing a metal sulfide this decomposition releases sulfur dioxide. The sulfur dioxide pollutant can be a governing factor in the upper limit of metal sulfide addition to the binder. If calcium or magnesium oxide is included in the bound material, demand on sulfur removal systems is reduced as formation of sulfates will occur. The sulfates may then act as an inert structure for the looping carrier or increase reactivity.

Addition of a carbonaceous material, such as pulverized coal, to the binder mix can provide improved sintering. During the oxidation treatment, the combustion of the carbonaceous material creates localized areas of high temperature, which aids in sintering. Sintering may further be improved if the agglomerate is exposed to inert or reducing atmospheres at 700-1000° C. prior to oxidation leading to the reduction of the metal oxides similar to the direct reduced iron process. The reduced species are easier to sinter and the heat lost during the reduction is regained during the oxidation step creating localized areas of high temperature. This carbonaceous material can also serve as the cold binder if bitumen or a polymer binder is used. Higher loadings may be used to provide higher porosity in the cured agglomerate.

This disclosure also provides methods for manufacture of looping carrier material for use in processes that rely on cycling the looping carrier between reduced and oxidized states. In general, such processes utilize a fuel to perform the reduction step of the looping carrier. The degree of fuel oxidation is dependent on the objective of the process. For instance, in CLC it is desired for the fuel to be fully oxidized to $CO_2$ and $H_2O$. While for CLG, partial oxidation of the fuel to carbon monoxide and $H_2$ products is targeted. Oxidation of the looping carrier can be performed with either air or steam. Air is used to oxidize the looping carrier when maximum oxidation and heat generation is desired. Steam is used in the oxidation step to produce a hydrogen product. In addition, a composition and ratio of the active and inactive components of the looping carrier is likely to vary among processes with different objectives. This disclosure provides for the customization of the looping carrier to fit the desired application.

Even with high strength looping carriers, significant generation of attrited fines is inevitable given the large quantity of solids circulation in chemical looping processes. An advantage of the present looping carriers is the ability to reformulate attrited fines back into usable looping carriers without introducing diluents in the binder. Accumulation of the inert cold binding agent can be mitigated through magnetic separation of the attrited fines. If magnetic separation is not possible, then a cold binder agent such as bitumen which is removed during the oxidative curing can be used. Lastly, the sinter enhancers can become part of the active material by proper cation selection.

EXAMPLES

Ten different looping material precursor formulations were prepared to exemplify this disclosure. An enriched taconite ore with around 68% by weight iron on an elemental basis was used as a metal oxide example. Two samples of steel mill waste products were used as examples of metal oxides containing FeO (steel waste a-SWa and steel waste b-SWb). These wastes are about 60% by weight iron on an elemental basis. They comprise reduced forms of iron oxide;

specifically 50-80% of the iron is present as FeO. Composition of the steel wastes are given in Table 1. SWa was used with a bitumen as the pelletizing agent. An oxidized ilmenite ore and enriched taconite ore were also included as metal oxide examples. Pyrite, a disulfide of iron, was used as an example of a sinter enhancer. Formulation naming convention used in this document is as follows. Raw material abbreviations used are: calcium aluminate cement (CA), calcium oxide (CO), pyrite (PYR), carbon black (CB), bitumen (BIT), steel waste a (SWa), steel waste b (SWb), oxidized ilmenite ore (ILM), and enriched taconite ore (Tac). An abbreviated form of the raw material is followed by a number indicating nominal dry weight percent in the formulation, e.g. CA20PYR5 refers to a formulation of 20 weight % calcium aluminate cement and 5 weight % pyrite with enriched taconite ore making up the remainder. Compositions of the formulations used in this document are given in Table 2. Two formulations, CA20Tac80 and CA10CO10Tac80 served as controls with different cold bonding mixtures. Seven formulations: CA20PYR10, CA20PYR10CB10, CA20PYR5, CA20CB5, CA20PYR2.5CB2.5, CA10CO10PYR5, and CA10CO10PYR2.5CB2.5 vary the sintering enhancer additives and the exotherm generator material. The last four formulations (Table 2) demonstrate the effects of oxidation state of the metal oxides. BIT6.5CO15PYR2.2SWa as formulation with a steel waste containing a bitumen binder and CA10CO10PYR2.5SWb with a cement binder and steel waste. CA10CO10PYR2.5CB2.5ILM8 and CA10CO10PYR2.5CB2.5ILM15 containing two levels of oxidized ilmenite ore.

Sample is placed in a 1-inch diameter fluidized bed reactor. Bed is fully fluidized with nitrogen and reactor is heated to a bed temperature of 880° C. At temperature, 21% oxygen is added to bed for approximately 25 minutes. A different firing procedure for CA20Tac80 and CA20PYR10CB10 formulations was used. For these formulations, gas containing 21% oxygen was supplied during heat up to 900° C. After the target reaction degree (greater than 80 percent oxidized) is achieved, the reactor is slowly cooled to room temperature under nitrogen.

Following the heat treatment, the generated looping material formulations previously containing pyrite had smooth surfaces indicative of melting occurring while those without pyrite did not. These formulations were also much harder. The precursor formulation CA20PYR10CB10 experienced severe agglomeration during heat treatment and was not subjected to any further tests. Attrition tests described as follows were then carried out on the remaining looping material formulations to determine the effectiveness of the pyrite containing binder.

The jet attrition procedure used to assess the looping carriers is described as follows. A 31.0 g sample of 100% passing 420 microns, 64.0% passing 250 microns, 28.0% passing 180 microns, 14.0% passing 150 microns, and 100% retained 100 microns of the heat-treated material was prepared. Room temperature sample was added to a 1-inch diameter fluidized bed reactor preheated to 900° C. The distributor plate of the reactor had six 1/64" holes allowing for high jet velocities (270-450 m/s) to be reached creating accelerated attrition conditions. Five of the holes are oriented such that they form the vertices of a pentagon and the

TABLE 1

Oxide composition of steel wastes.

| | Oxide Analysis, Weight % | | | | | | | | | | | % Fe as |
|---|---|---|---|---|---|---|---|---|---|---|---|---|
| | Fe | SiO2 | Al2O3 | TiO2 | CaO | MgO | MnO | Na2O | K2O | P | Cr2O3 | FeO |
| SWa | 63.19 | 1.54 | 0.87 | 0.04 | 1.18 | 0.17 | 0.55 | 0.02 | 0.03 | 0.09 | — | 48.21 |
| SWb | 61.11 | 0.57 | 0.22 | 0.07 | 7.12 | 2.72 | 1.24 | <0.1 | 0.02 | 0.06 | 0.13 | 77.10 |

A 200 g batch of each looping material precursor formulation was weighed out. Formulation components (Table 2) were blended together in a ball mill for 15 minutes. For all formulations with cement, the blended solids were placed in a 4.5-inch cylindrical drum. With the drum rotating at about 300 rpm and agitator rod in place to scrape along the sides and bottom of the drum, water was added in 1 ml spray bursts until a desired consistency was reached. The proper consistency is when the material begins sticking to itself forming pellets in the drum. Total water added is binder dependent. Approximately 30 ml of water was used for the 20 weight % calcium aluminate cement binders and 55 ml of water for 10 weight % calcium aluminate cement 10 weight % calcium oxide binders. Material was then scraped over a 16-mesh screen. Pellets were placed in a curing environment of approximately 25° C. and 90% humidity for 48 hours. For the formulation with bitumen binder, following blending in a ball mill, the pellets in the size range of 100-800 microns were collected.

Cured precursor pellets of the cement formulations are dried at 105° C. then crushed to 100% passing 420 microns. A 100 g sample of 100% passing 420 microns, 50% passing 250 microns, 30% passing 180 microns, 15% passing 150 microns, and 100% retained 100 microns is prepared.

sixth hole is centered within the pentagon. Pre-weighed filters on the outlet stream captured attrited fines. The fluidizing gases were cycled as follows: 5 volume % carbon monoxide, 5 volume % carbon dioxide, 5 volume % hydrogen, and 85 volume % nitrogen to represent reducing conditions for 4 minutes, 100% nitrogen (inert) purge for 2 min, 10% oxygen and 90% nitrogen representing oxidizing conditions for 4 minutes, 100% nitrogen (inert) purge for 2 min. Cycles were performed at 3, 4, and 5 standard liters (70° F. and 1 atm.) per minute (slpm) of total bed gas flows to create increasingly severe jet attrition conditions with jet velocities of 270, 360, and 450 m/s respectively (higher flow rates results in higher jet attrition velocities). Six cycles at 3 slpm were performed first to condition the material. Filters to separate the attrited particles that were entrained with the gas were used. The attrited particles were collected during this conditioning phase, but the data was not included in the reported average attrition rate. Attrition data was obtained by running 9 cycles at 3 slpm, 6 cycles at 4 slpm, lastly 5 full cycles and a half cycle ending after the first purge to yield a looping material in its reduced state at 5 slpm. Three filters were collected at each jet velocity condition and filter switching occurred at the start of the reduction phase. An attrition rate percent, $r_{att}$, in the units of %/hour at each of the jet velocity conditions is calculated by Eq. 1 where $m_i$ is the mass of looping material remaining in the reactor at the start of filter i collection, and t is the collection time of filter i in hours. Data is reported as an average of $r_{att}$ at each jet velocity condition. A jet attrition index is assigned by the average of the attrition rates at 3, 4, and 5 slpm divided by 0.9.

$$r_{att.} = \frac{2(m_i - m_{i+1})}{(m_i + m_{i+1})t} * 100\% \quad (1)$$

Results of the attrition tests are given in Table 3. The formulations (metal oxide-based looping material) with sinter additives show a clear advantage to those without the sinter additives in the precursor pellet. It is also clear that carbon (exotherm generator) without pyrite (sinter enhancer) is not effective. However, by supplying localized heat, it may have a synergistic effect when combined with pyrite as shown in the comparison of looping materials derived from CA10CO10PYR5 and CA10CO10PYR2.5CB2.5. Addition of carbon to reduce pyrite loading is beneficial as it reduces sulfur species emissions. Additionally, pyrite has a limit to its effectiveness. Comparing looping material formulations derived from CA20PYR10 and CA20PYR5 shows the lower pyrite loading has better attrition resistance.

The addition of calcium oxide (CO) to cold binder also plays a role in the effectiveness of the sintering additives. Without the sintering additives, the cold binder blend of CA and CO outperformed the CA binder. Also, looping materials derived from CA10CO10PYR2.5CB2.5 had better attrition resistance than that from CA20PYR2.5CB2.5. However, when a 5 weight % loading of pyrite was used the CA binder gave better attrition resistance.

Additionally, formulations with steel wastes as the metal oxide to be bound had the lowest attrition rates of all the formulations tested. Without being bound by theory, the presence of reduced forms of iron oxide (example FeO) in the steel wastes results in higher strength in the looping carrier material formed from the oxidation of the looping carrier precursor pellet comprising these starting materials, because of increased sintering from the localized high temperatures within the pellet resulting from the exothermic oxidation reaction.

The cement-free cold binding methods (e.g. with bitumen) are able to perform as well or even better than those with cement. However, pellets of formulations without cement were more easily broken, when using a finger-roll test, before heat treatment compared to those with cement. Thus, use of the bitumen binder may require special material handling accommodations.

Lastly, the formulations with ilmenite demonstrate the opposite effect seen with the steel wastes in that the metal oxides in ilmenite are in a less reduced state and had higher attrition rates compared to steel wastes formulations.

All formulations acted as looping carriers for CLC. Conversions of the reducing gases are given in Table 4. All formulations had similar conversions, CA20Tac80 had the lowest but that is in part a result of looping carrier mass lost from attrition. The testing procedure is not optimized for kinetic studies and the reported conversions serve more as validation that the looping carriers were indeed cycling between reduced and oxidized states.

TABLE 2

Composition of formulations (metal oxide-based looping material precursor) in weight percent, dry basis.

| Formulation | Enriched Taconite Ore | Steel Waste | Oxidized Ilmenite | Calcium Aluminate Cement | Calcium Oxide | Bitumen | Pyrite | Carbon Black |
|---|---|---|---|---|---|---|---|---|
| CA20Tac80 | 80 | — | — | 20 | — | — | — | — |
| CA20PYR10CB10 | 64 | — | — | 18 | — | — | 9.1 | 9.1 |
| CA20PYR10 | 70 | — | — | 20 | — | — | 10 | — |
| CA20PYR5 | 75 | — | — | 20 | — | — | 5.0 | — |
| CA20CB5 | 76 | — | — | 19 | — | — | — | 4.8 |
| CA20PYR2.5CB2.5 | 76 | — | — | 20 | — | — | 2.4 | 2.4 |
| CA10CO10Tac80 | 80 | — | — | 10 | 10 | — | — | — |
| CA10CO10PYR5 | 75 | — | — | 10 | 10 | — | 5.0 | — |
| CA10CO10PYR2.5CB2.5 | 76 | — | — | 9.8 | 9.8 | — | 2.4 | 2.4 |
| BIT6.5CO15PYR2.2SWa | 44 | 34 | — | — | 13 | 6 | 2.2 | — |
| CA10CO10PYR2.5SWb | 39 | 39 | — | 10 | 10 | — | 2.5 | — |
| CA10CO10PYR2.5CB2.5ILM8 | 68 | — | 7.5 | 10 | 10 | — | 2.5 | 2.5 |
| CA10CO10PYR2.5CB2.5ILM15 | 60 | — | 15 | 10 | 10 | — | 2.5 | 2.5 |

TABLE 3

Jet attrition rates of formulations (metal oxide-based looping material) at varying volumetric flows.

| Formulation derived from the following looping material precursors | Attrition rate at 3 slpm bed flow (%/hr.) | Attrition rate at 4 slpm bed flow (%/hr.) | Attrition rate at 5 slpm bed flow (%/hr.) | Jet Attrition Index |
|---|---|---|---|---|
| CA20Tac80 | 0.84 | 2.8 | 6.5 | 3.76 |
| CA20PYR10 | 0.32 | 0.43 | 0.79 | 0.570 |
| CA20PYR5 | 0.23 | 0.30 | 0.39 | 0.34 |
| CA20CB5 | 2.1 | 3.6 | 9.8 | 5.74 |

TABLE 3-continued

Jet attrition rates of formulations (metal oxide-based looping material) at varying volumetric flows.

| Formulation derived from the following looping material precursors | Attrition rate at 3 slpm bed flow (%/hr.) | Attrition rate at 4 slpm bed flow (%/hr.) | Attrition rate at 5 slpm bed flow (%/hr.) | Jet Attrition Index |
|---|---|---|---|---|
| CA20PYR2.5CB2.5 | 0.20 | 0.49 | 1.9 | 0.959 |
| CA10CO10Tac80 | 0.62 | 1.1 | 2.0 | 1.38 |
| CA10CO10PYR5 | 0.43 | 0.73 | 1.5 | 0.985 |
| CA10CO10PYR2.5CB2.5 | 0.05 | 0.13 | 0.28 | 0.17 |
| BIT6.5CO15PYR2.2SWa | 0.02 | 0.03 | 0.08 | 0.048 |
| CA10CO10PYR2.5SWb | 0.02 | 0.04 | 0.07 | 0.048 |
| CA10CO10PYR2.5CB2.5ILM8 | 0.11 | 0.15 | 0.42 | 0.25 |
| CA10CO10PYR2.5CB2.5ILM15 | 0.15 | 0.25 | 0.39 | 0.29 |

TABLE 4

Reducing gases conversion using metal-oxide based looping material formulations at 5 slpm bed flow.

| Formulations derived from the following looping material precursors | Reducing gas conversion (%) |
|---|---|
| CA20Tac80 | 61 |
| CA20PYR10 | 74 |
| CA20PYR5 | 80 |
| CA20CB5 | 75 |
| CA20PYR2.5CB2.5 | 81 |
| CA10CO10Tac80 | 87 |
| CA10CO10PYR5 | 81 |
| CA10CO10PYR2.5CB2.5 | 87 |
| BIT6.5CO15PYR2.2SWa | 81 |
| CA10CO10PYR2.5SWb | 76 |
| CA10CO10PYR2.5CB2.5ILM8 | 80 |
| CA10CO10PYR2.5CB2.5ILM15 | 81 |

The following example demonstrates how the looping carrier may be recycled without additional pelletizing agent. The CA10CO10PYR2.5SWb looping material precursor from the previous examples was oxidized to make a looping material and then subjected to oxidation and reduction cycles under chemical looping combustion conditions. The looping material, in its reduced state, was crushed to particle sizes less than 20 microns, to simulate attrited material. A mixture of 95 weight % crushed recycled looping material and a binder, comprising 2.5 weight % pyrite, and 2.5 weight % carbon black, were dry-blended together until well mixed. The mixture was pelletized following the same procedure used in the initial forming of the looping carrier but only with the addition of moisture followed by drying. Following the pelletization step, which comprised only the addition of moisture, the looping carrier precursor had similar strength compared to prior looping carrier precursors made with the addition of pelletizing agents. This suggests the pelletizing agents of the original CA10CO10PYR2.5SWb looping material precursor had been regenerated after subsequently being subjected to chemical looping combustion conditions.

Figure 2:
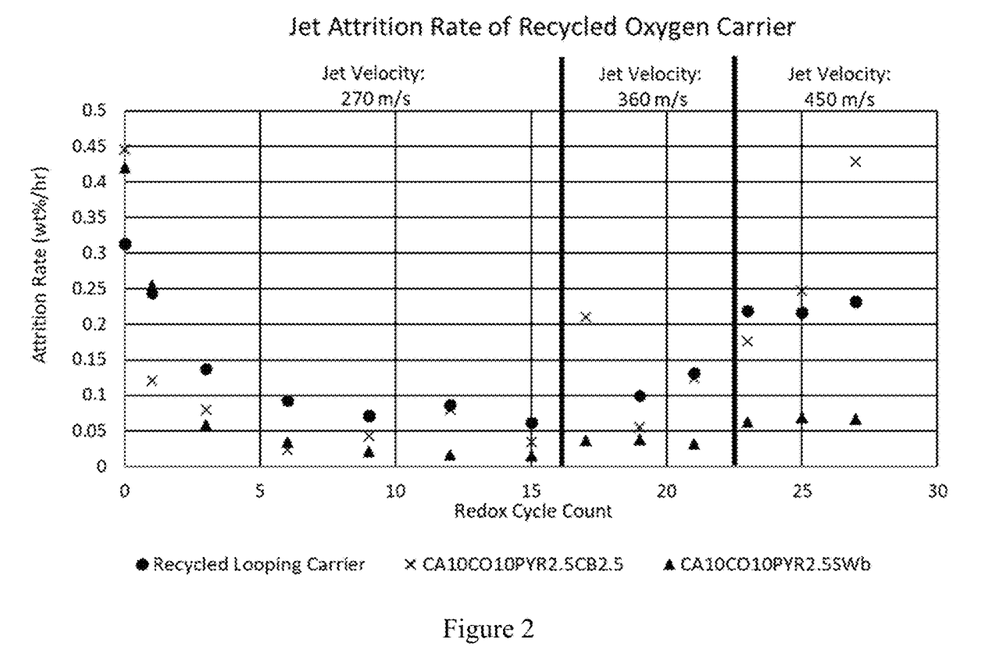
FIG. 2 provides jet attrition rates of recycled oxygen carriers.

The recycled looping carrier precursor pellet was then subjected to the same heat treatment procedure as earlier to activate the binder (sinter enhancers). Attrition resistance of the heat treated looping carrier was checked with the previously described jet attrition test and the results are given in FIG. 2. The recycled looping carrier jet attrition index was 0.13. The attrition resistance was similar to CA10CO10PYR2.5CB2.5, which used the same sinter enhancers used for the recycled looping carrier. It had less attrition resistance (higher jet attrition index) compared to CA10CO10PYR2.5SWb, as this looping carrier has FeO as a reduced metal oxide component. The iron in the recycled looping carrier and CA10CO10PYR2.5CB2.5 are in the less reduced $Fe_3O_4$ state.

Modification to the firing method to avoid agglomeration was also tested. All of the metal oxide-based looping carrier precursor formulations previously described underwent the heat treatment process batch wise in a fluidized bed reactor without spouting. All of these formulations with sinter enhancer experienced significant inter-particle agglomeration and required grinding. Following is a description of a procedure to exemplify a heat treatment method to avoid inter-particle agglomeration.

A spouted fluid bed reactor was used to perform the heat treatment. The reactor consisted of a 3-inch pipe with a wire mesh distributor plate. Centered within the 3-inch pipe was a one inch diameter and nine inches in length draft tube that was supported one inch above the distributor plate. A ¼" tube was used to provide spouting gas. It was routed through the plenum section and penetrates the distributor plate in the center with the exit directed to the draft tube.

A total of 1.2 kg of CA10CO10PYR2.5SWb of metal oxide-based looping material precursor was prepared following the procedure previously described up to the point of heat treatment. The material was placed in the spouted fluid bed reactor and heated to 830° C. under nitrogen. Flow of nitrogen was adjusted during heating to maintain 20 liters per minute (lpm) in the annulus section and 40 lpm through the spout.

At temperature, oxygen was increasingly added to spout gas over a period of 15 minutes to yield a stream ranging from 10-33 volume % oxygen. Oxygen was held at 33 volume % for 2 minutes before external heaters were turned off and cooling began. Temperatures of bed material reached 940° C. during the heat treatment process. Upon inspection of bed material following cooling, no inter-particle agglomeration of the metal oxide-based looping material was observed. Attrition resistance was checked with the previously described jet attrition test and was in agreement with results obtained using the fluidized bed heat treatment method. The procedure was also repeated except instead of adding oxygen in the spout gas it was added to the annulus section. Inspection of material following this test showed significant inter-particle agglomeration.

A number of implementations have been described. Nevertheless, it will be understood that additional modifications may be made without departing from the scope of the inventive concepts described herein, and, accordingly, other examples are within the scope of the following claims and other claims made during consideration of the patent application.

What is claimed is:

1. A method of forming a metal oxide-based looping material comprising the steps of:
   A) mixing metal oxides of at least one of the metals Fe, Mn, Cu, Ni, Co, Mg, Ca, Sr and a thermosetting binder with a cure temperature of at least 700° C. comprising about 5-30% by weight sinter enhancer and about 40 to 95% by weight of a pelletizing agent, to form a mixture of about 5% to 30% by weight binder on a dry basis;
   B) agglomerating the mixture from step A to form metal oxide-based looping material precursor pellets; and
   C) performing heat treatment on the precursor pellets from step B by exposing the pellets to oxidative conditions of no more than 1000° C. and for a time period such that the metal oxide-based looping material is at least 80 percent oxidized.

2. The method of claim 1 wherein the sinter enhancer comprises at least one of: sulfides of one of the metals: Fe, Mn, Cu, Co, Mg, Ca, Sr, Ba, chlorides of one of the metals: Mn, Cu, Co, or nitrates of one of the metals: Fe, Mn, Cu, Co, Mg, Ca Sr, Ba, and combinations of these.

3. The method of claim 2 wherein the pelletizing agent comprises at least one of a cement, calcium aluminate cement, Portland cement, lime, hydrated lime, dolomitic lime, calcium oxide, magnesium oxide, a bitumen, a polysaccharide, polyvinylpyrrolidone, polyvinyl alcohol, polyurethane, bentonite, and a clay.

4. The method of claim 1 wherein air and or steam is used in the heat treatment step C.

5. The method of claim 1 wherein the ratio of metal oxides to sinter enhancer in the mixture of step A is between about 80 to 1 and about 10 to 1 by weight.

6. The method of claim 1 wherein the binder comprises an exotherm generator material comprising at least one of a carbonaceous material, a metal, a reduced metal oxide, and an organometallic compound, and the exotherm generator material constitutes at least about 5% by weight of the binder.

7. The method of claim 1 wherein at least some of the metal oxides are in an oxidation state capable of being further oxidized under temperatures less than 1000° C. and a partial pressure of oxygen less than 0.2 atm.

8. The method of claim 1 where metal oxide-based looping material precursor pellets of step B are mixed with heat treated looping material from Step C prior to exposing the precursor pellets to oxidative conditions.

9. The method of claim 1 wherein the heat treatment is performed in a spouted fluid bed reactor system and wherein an oxygen-rich gas is used as the spout gas and a mostly oxygen-free gas is used to fluidize an annular region of the fluid bed.

10. A method of forming a metal oxide-based looping material comprising the steps of:
   A) mixing attrited fines of a looping carrier material formed from the oxidation of metal oxide-based looping material precursor pellets comprising metal oxides of at least one of the metals Fe, Mn, Cu, Ni, Co, Mg, Ca, Sr, with water and a sinter enhancer comprising at least one of a metal sulfide, a metal chloride, and a metal nitrate;
   B) agglomerating the mixture from step A to form metal oxide-based looping material precursor pellets; and
   C) exposing the precursor pellets to oxidative conditions of no more than 1000° C. and for a time period such that the metal oxide-based looping material is at least 80 percent oxidized.

* * * * *